(12) United States Patent
Xue et al.

(10) Patent No.: US 9,874,142 B2
(45) Date of Patent: Jan. 23, 2018

(54) INTEGRATED PYROLYSIS AND ENTRAINED FLOW GASIFICATION SYSTEMS AND METHODS FOR LOW RANK FUELS

(71) Applicant: GENERAL ELECTRIC COMPANY, Schenectady, NY (US)

(72) Inventors: Junli Xue, Shanghai (CN); Lishun Hu, Shanghai (CN); Thomas Frederick Leininger, Chino Hills, CA (US); Richard Anthony Depuy, Burnt Hills, NY (US); Xijing Bi, Shanghai (CN)

(73) Assignee: General Electric Company, Schenectady, NY (US)

( * ) Notice: Subject to any disclaimer, the term of this patent is extended or adjusted under 35 U.S.C. 154(b) by 226 days.

(21) Appl. No.: 14/772,797

(22) PCT Filed: Oct. 17, 2013

(86) PCT No.: PCT/CN2013/085398
§ 371 (c)(1),
(2) Date: Sep. 4, 2015

(87) PCT Pub. No.: WO2014/134920
PCT Pub. Date: Sep. 12, 2014

(65) Prior Publication Data
US 2016/0017801 A1    Jan. 21, 2016

Related U.S. Application Data

(63) Continuation-in-part of application No. 13/788,655, filed on Mar. 7, 2013, now Pat. No. 9,453,171.

(51) Int. Cl.
*C10J 3/66* (2006.01)
*C10L 5/04* (2006.01)
(Continued)

(52) U.S. Cl.
CPC ............... *F02C 3/28* (2013.01); *C10J 3/466* (2013.01); *C10J 3/62* (2013.01); *C10J 3/66* (2013.01);
(Continued)

(58) Field of Classification Search
CPC ..... C10J 3/00; C10J 3/721; C10J 3/466; C10J 2300/0906; C10J 2300/0909;
(Continued)

(56) References Cited

U.S. PATENT DOCUMENTS 3,039,955 A    6/1962  Honnold, Jr.
3,844,733 A   10/1974  Donath
(Continued)

FOREIGN PATENT DOCUMENTS

CN         1557919 A      12/2004
CN       102424359 A       4/2012
(Continued)

OTHER PUBLICATIONS

Unofficial English Translation of Chinese Office Action issued in connection with corresponding CN Application No. 01380074362.9 dated Aug. 1, 2016.
(Continued)

*Primary Examiner* — Matthew J Merkling
(74) *Attorney, Agent, or Firm* — GE Global Patnet Operation

(57) ABSTRACT

In one aspect, a gasification system for use with low rank fuel is provided The system includes a pyrolysis unit positioned to receive a feed of low rank fuel, the pyrolysis unit being configured to pyrolyze the low rank fuel to produce pyrolysis gas and fixed carbon. The system also includes a gasifier configured to produce a syngas stream using the received fixed carbon, a cooler configured to receive and cool the syngas stream, and a first conduit coupled between
(Continued)

the cooler and the pyrolysis unit. The first conduit is configured to recycle at least a portion of the syngas stream to the pyrolysis unit such that the recycled syngas stream is mixed with the pyrolysis gas to produce a hydrocarbon-rich syngas stream containing gasification by-products. The system also includes a by-product recovery system coupled to the pyrolysis unit for removing the gasification by-products from the hydrocarbon-rich syngas stream.

14 Claims, 2 Drawing Sheets

(51) Int. Cl.

| | | |
|---|---|---|
| C10J 3/62 | (2006.01) | |
| F02C 3/28 | (2006.01) | |
| C10J 3/72 | (2006.01) | |
| C10J 3/46 | (2006.01) | |
| C10L 9/08 | (2006.01) | |
| C10K 1/08 | (2006.01) | |
| C10L 5/44 | (2006.01) | |

(52) U.S. Cl.
CPC ............... *C10J 3/721* (2013.01); *C10K 1/08* (2013.01); *C10L 5/04* (2013.01); *C10L 9/083* (2013.01); *C10J 2300/094* (2013.01); *C10J 2300/0906* (2013.01); *C10J 2300/0909* (2013.01); *C10J 2300/0959* (2013.01); *C10J 2300/0976* (2013.01); *C10J 2300/165* (2013.01); *C10J 2300/1653* (2013.01); *C10J 2300/1662* (2013.01); *C10J 2300/1678* (2013.01); *C10J 2300/1823* (2013.01); *C10J 2300/1853* (2013.01); *C10L 5/44* (2013.01); *C10L 2290/02* (2013.01); *C10L 2290/04* (2013.01); *C10L 2290/06* (2013.01); *C10L 2290/10* (2013.01); *C10L 2290/24* (2013.01); *Y02E 20/16* (2013.01); *Y02E 20/18* (2013.01); *Y02E 50/15* (2013.01)

(58) Field of Classification Search
CPC .......... C10J 2300/0959; C10J 2300/165; C10J 2300/1823
See application file for complete search history.

(56) References Cited

U.S. PATENT DOCUMENTS

| | | |
|---|---|---|
| 3,963,426 A | 6/1976 | Hand |
| 3,988,123 A | 10/1976 | Coates |
| 4,013,428 A | 3/1977 | Babbitt |
| 4,078,973 A | 3/1978 | Choi et al. |
| 4,497,637 A | 2/1985 | Purdy et al. |
| 4,861,346 A * | 8/1989 | Najjar ..................... C10L 1/326 44/280 |
| 5,034,021 A | 7/1991 | Richardson |
| 5,134,944 A | 8/1992 | Keller et al. |
| 5,139,535 A * | 8/1992 | Strickland ................. C10J 3/02 48/76 |
| 5,550,312 A | 8/1996 | Schingnitz et al. |
| 6,033,456 A | 3/2000 | Jahnke |
| 7,888,540 B2 | 2/2011 | Deluga et al. |
| 7,955,403 B2 | 6/2011 | Ariyapadi et al. |
| 8,002,972 B2 | 8/2011 | Morris, Jr. et al. |
| 8,043,391 B2 | 10/2011 | Dinjus et al. |
| 8,100,990 B2 | 1/2012 | Ellens et al. |
| 8,182,771 B2 | 5/2012 | Frydman et al. |
| 2006/0112639 A1 | 6/2006 | Nick et al. |
| 2008/0098654 A1 | 5/2008 | Cherry et al. |
| 2008/0103220 A1 | 5/2008 | Cherry et al. |
| 2008/0222956 A1 | 9/2008 | Tsangaris et al. |
| 2009/0031615 A1 | 2/2009 | Joshi et al. |
| 2009/0084666 A1 | 4/2009 | Agrawal et al. |
| 2009/0107046 A1 | 4/2009 | Leininger et al. |
| 2009/0173081 A1 | 7/2009 | Wallace et al. |
| 2010/0170247 A1 | 7/2010 | Bommareddy et al. |
| 2010/0263383 A1 | 10/2010 | York et al. |
| 2011/0009501 A1 | 1/2011 | Ernst |
| 2011/0186489 A1 | 8/2011 | Kain et al. |
| 2011/0314736 A1 | 12/2011 | Crespin |
| 2012/0036777 A1 | 2/2012 | Patel |
| 2012/0039776 A1 | 2/2012 | Ghosh |
| 2012/0244448 A1 | 9/2012 | Hallum et al. |
| 2013/0199919 A1* | 8/2013 | Li ........................ C10B 47/30 201/7 |
| 2013/0239479 A1 | 9/2013 | Gao et al. |

FOREIGN PATENT DOCUMENTS

| | | |
|---|---|---|
| CN | 102465043 A | 5/2012 |
| CN | 102604683 A | 7/2012 |
| JP | 2012246503 A | 12/2012 |

OTHER PUBLICATIONS

U.S. Appl. No. 13/788,655, filed Mar. 7, 2013, Anindra Mazumdar.

Zanzi et al., "Rapid Pyrolysis of Bagasse at High Temperature", In: Proceedings of the 3rd Asia-Pacific International Symposium on Combustion and Energy Utilization, vol. No. 1, pp. 211-215, 1995.

Chang et al., "Bagasse gasification technologies for electricity production in the sugar industry", Proc S Afr Sug Technol Ass, vol. No. 73, pp. 247-250, 1999.

Erlich et al, "Pyrolysis and Gasification of Pellets from Sugar Cane Bagasse and Wood", Fuel, vol. No. 85, Issues 10-11, pp. 1535-1540, Jul.-Aug. 2006.

Peng et al,, "Fast Pyrolysis Characteristics of Sugarcane Bagasse Hemicellulose", Cellulose Chemistry and Technology, vol. No. 45, Issue No. 9-10, pp. 605-612, 2011.

Santos, "Solar Gasification of Sugarcane Bagasse: Thermogravimetric Analysis of the Kinetics of Pyrolysis and Steam Gasification", Master thesis in Chemical Engineering, Apr. 23, 2012.

Toqan DR., "A Novel Concept for Preferential Production of Methane Rich Syngas from Coal", Small Business innovation Research Small Business Technology Transfer, Aug. 29, 2012.

PCT Search Report and Written Opinion issued in connection with corresponding Application No. PCT/CN2013/085398 dated Jan. 23, 2014.

\* cited by examiner

INTEGRATED PYROLYSIS AND ENTRAINED FLOW GASIFICATION SYSTEMS AND METHODS FOR LOW RANK FUELS

CROSS-REFERENCE TO RELATED APPLICATIONS

This application is a continuation-in-part application of and claims priority to U.S. patent application Ser. No. 13/788,655, filed Mar. 7, 2013, which is hereby incorporated by reference in its entirety.

BACKGROUND

The field of the invention relates generally to gasification systems, and more particularly, gasification systems for producing synthetic natural gas (SNG) from low rank fuels.

Feedstock, such as coal, petroleum coke, biomass, wood-based materials, agricultural wastes, tars, coke oven gas and asphalt, and other carbon-containing items may be gasified for use in the production of electricity, chemicals, synthetic fuels, and for a variety of other applications. Gasification generally involves reacting a carbonaceous fuel and oxygen at a very high temperature to produce syngas, a fuel containing primarily carbon monoxide and hydrogen. Syngas typically burns more efficiently and cleaner than the fuel in its original state before gasification. The syngas maybe used for power generation, chemical production, and any other suitable application.

Some carbon containing solid feedstocks commonly known as low rank feedstocks, however, are unsuitable and/or inefficient for use in connection with some known gasification systems. Low rank feedstocks are typically undesirable due to their low heating value and inherently higher oxygen content as compared to fuels typically used in gasification systems. In addition, low rank fuels typically form a very watery slurry, and typical entrained gasification systems are inefficient in producing syngas with such fuels.

BRIEF DESCRIPTION

In one aspect, a gasification system for use with low rank fuel is provided. The gasification system includes a pyrolysis unit configured to receive low rank fuel and to pyrolyze the low rank fuel to produce pyrolysis gas and fixed carbon. The gasification system also includes a gasifier configured to produce a syngas stream using the fixed carbon and a cooler configured to cool the syngas stream. A first conduit, coupled between the cooler and the pyrolysis unit is configured to recycle at least a portion of the syngas stream to the pyrolysis unit, wherein the recycled syngas stream is mixed with the pyrolysis gas to produce a hydrocarbon-rich syngas stream containing gasification by-products. A by-product recovery system is coupled to the pyrolysis emit for removing the gasification byproducts from the hydrocarbon-rich syngas stream.

In another aspect, an integrated gasification combined-cycle power generation plant is provided. The integrated gasification combined-cycle power generation plant includes at least one gasification system that includes a pyrolysis unit configured to receive low rank fuel and to pyrolyze the low rank fuel to produce pyrolysis gas and fixed carbon. The gasification system also includes a gasifier configured to produce a syngas stream using the fixed carbon and a cooler configured to cool the syngas stream. A first conduit, coupled between the cooler and the pyrolysis unit is configured to recycle at least a portion of the syngas stream to the pyrolysis unit, wherein the recycled syngas stream is mixed with the pyrolysis gas to produce a hydrocarbon-rich syngas stream containing gasification by-products. A by-product recovery system is coupled to the pyrolysis unit for removing the gasification by-products from the hydrocarbon-rich syngas stream. The integrated gasification combined-cycle power generation plant also includes at least one gas turbine engine coupled in flow communication with the cooler to receive at least a portion of the syngas stream.

In yet another aspect, a method of gasifying a low rank fuel is provided. The method includes providing a feed of low rank fuel to a pyrolysis unit and pyrolyzing the feed of low rank fuel to produce pyrolysis gas and fixed carbon. The fixed carbon is then channeled to a gasifier for gasifying the fixed carbon to produce a syngas stream. At least a portion of the syngas stream is mixed with the pyrolysis gas to produce a hydrocarbon-rich syngas stream containing gasification by-products, which are removed from the hydrocarbon-rich syngas stream using a by-product recovery system.

DETAILED DESCRIPTION

Figure 1:
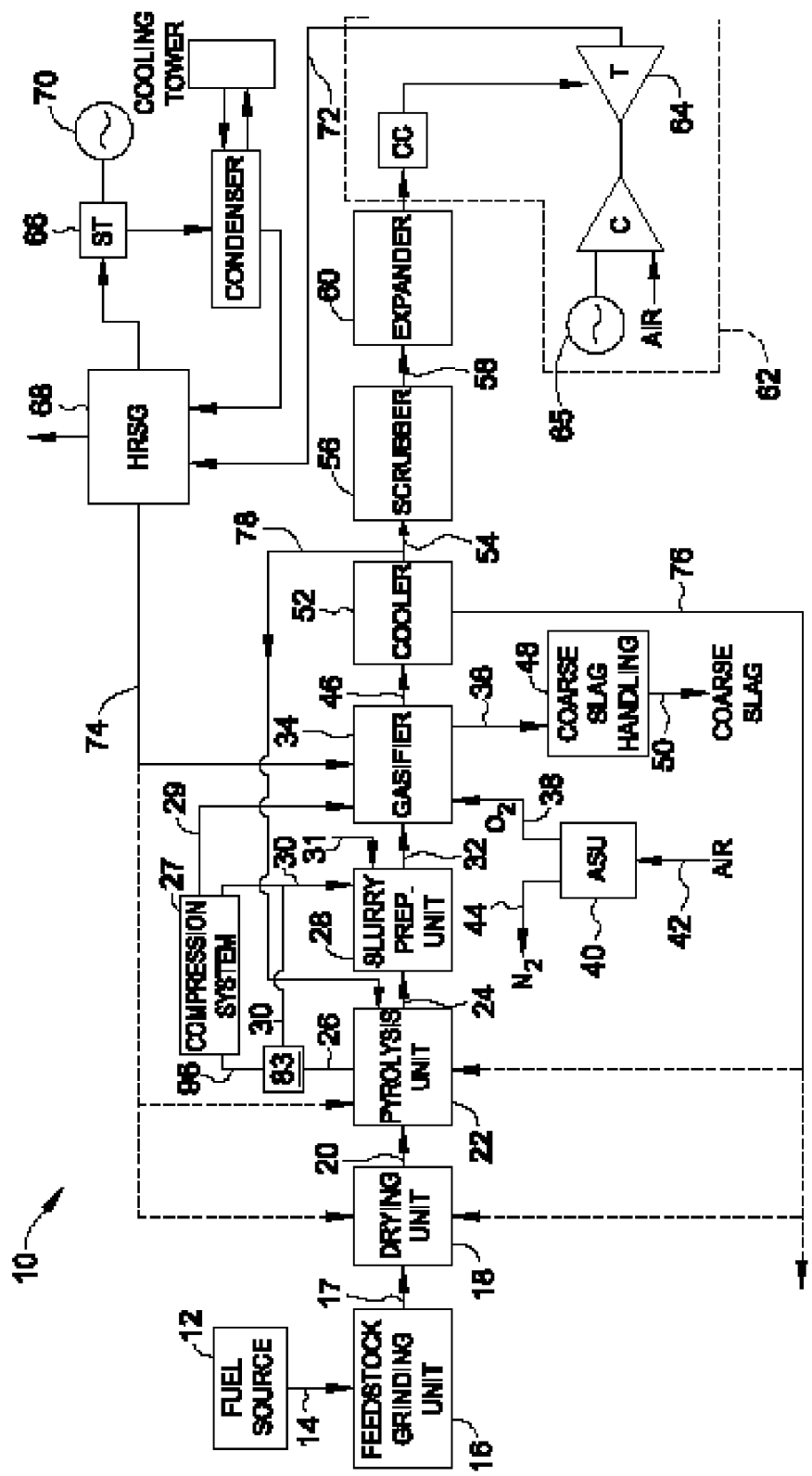
FIG. 1 is a schematic view of an exemplary power generation system.

FIG. 1 is a schematic diagram of an exemplary gasification facility 10, for example, an integrated gasification combined-cycle (IGCC) power generation system, which produces and/or bums synthetic gas, i.e. syngas, to generate electricity and/or to make chemicals. System 10 includes a fuel source 12 that is a low rank fuel. Fuel source 12 may include low rank coal, petroleum, coke, biomass, wood-based materials, agricultural wastes, tars, coke oven gas and asphalt, and/or other carbon containing feedstocks. As used herein, coals having a "low rank" typically have a lower grade than bituminous coal (e.g., sub-bituminous or lignitic coal). In some cases, low rank coals may have a relatively high oxygen content, such as from about 13% to 35% by weight. Low rank coals may have other characteristics including a relatively high moisture content, such as in the range of about 10% to 40%, and a relatively high awash content, such as in the range of about 3% to 50%. Low rank coals are present in abundance in the mid-continent region of the United States (as Powder River Basin coal) and in China (as brown coal). In some cases, biomass fuels, such as bagasse, may have a relatively high oxygen content, such as from about 30% to 45% by weight. Bagasse may have other characteristics including a relatively high moisture content, such as in the range of about 20% to 70%, that prevent it from being used in gasification without further processing Low rank feedstocks may be inefficient for use in some known gasifiers (e.g, entrained flow gasifiers) because of the low heating value and high water content intrinsic to such coal and bagasse.

In the exemplary embodiment, a feedstock 14 (e g., a low rank coal or biomass fuel such as bagasse) is conveyed to a feedstock grinding unit 16 that resizes or reshapes feedstock 14 by chopping, milling, shredding, pulverizing, briquetting, and/or pelletizing feedstock 14 to generate a gasification fuel 17. Feedstock 17 is then conveyed to a drying unit 18 wherein it is exposed to a temperature that is high enough to facilitate removing moisture from fuel 17. Drying unit 18 produces a dried feedstock 20 that is conveyed to a pyrolysis unit 22. In an alternative embodiment, drying unit 18 and pyrolysis unit 22 may be a single operational unit that dries and pyrolyzes fuel 17.

In the exemplary embodiment, pyrolysis unit 22 uses a pyrolysis process to pyrolyze dried feedstock 20. Alternatively, pyrolysis unit 22 may be any type of pyrolysis unit that enables system 10 to function as described herein. Temperatures inside pyrolysis unit 22 may range from approximately 150° C. to about 800° C., depending on the type of pyrolysis unit used. Heating the dried feedstock 20 during the pyrolysis process substantially removes any residual moisture and the volatiles in the low rank fuel and may generate a solid 24 (e.g, a char, a fixed carbon) and a pyrolysis gas 26 comprising non-condensable hydrocarbons such as, but not limited to, methane and condensable hydrocarbons such as, but not limited to, tars and light oils. The fixed carton from the pyrolysis process may weigh up to approximately 20% to 40% of the weight of the original feedstock. Gasification of low rank fuels such as low rank coal and bagasse that have a relatively high moisture content has been a traditionally difficult process. However, subjecting such fuels to the pyrolysis process described herein facilitates reducing the oxygen and moisture content of the fuel such that there is a relatively higher concentration of carbon content in solid char 24 than in feedstock 20, which increases the heating value of the fuel.

In the exemplary embodiment, char 24 is channeled to a slurry preparation unit 28 wherein water 30, or another suitable liquid, maybe added to char 24 to create slurry feedstock 32. In at least one embodiment, at least a portion of pyrolysis gases 26 are channeled to a compression system 27 and condensable hydrocarbons are condensed into a liquid, which may then be channeled into slurry preparation unit 28 as water 30 for use in creating slurry 32. This is especially true when using a biomass fuel such as bagasse because the moisture content of bagasse is significantly greater than the moisture content of low rank coal. In another embodiment, a ration of the moisture removed from the feed in drying unit 18 is condensed to provide the water 30 used in generating the slurry. Alternatively, or in combination with water 30, when a biomass such as bagasse is used as the fuel, untreated ground bagasse feedstock 31 maybe introduced to slurry preparation unit 28 to provide the liquid requited to create slurry feedstock 32. Ground feedstock 31 is processed such that the grinding operation disrupts the cellular structure of the bagasse such that internal water trapped in the bagasse is released as external water 30 for use by slurry preparation unit 28. Furthermore, at least a portion 29 of pyrolysis gases 26, the non-condensable hydrocarbons, bypasses slurry preparation unit 28 and is channeled into a gasifier 34 se relate from slurry 32 or may bypass gasifier 34 and be channeled to downstream cleaners for use as a fuel gas in power generation. Slurry feedstock 32 is routed to gasifier 34 from slurry preparation unit 28.

In the exemplary embodiment, gasifier 34 is an entrained flow gasifier. Alternatively, gasifier 34 maybe any type of gasifier that enables system 10 to function as described herein. Gasifier 34 converts slurry feedstock 32 into a syngas, e.g., a combination of carbon monoxide and hydrogen. This conversion may be accomplished by subjecting the fuel to a controlled amount of a suitable moderator and a sub stoichiometric amount of oxygen at an elevated pressure (e.g., between approximately 20 bar and 90 bar) and at an elevated temperature (e.g., between approximately 700° C. and 1600° C.), depending on the type of fuel and the type of gasifier used. The conversion of fuel during gasification may generate a slag 36 (e.g., a molten ash material) and residual gases (e.g., carbon monoxide, hydrogen, carbon dioxide and water vapor, with lesser amounts of methane, nitrogen, argon, hydrogen sulfide and carbonyl sulfide). Slag 36 may be removed from gasifier 34, quenched and disposed of, for example, as road base or as another building material.

In the exemplary embodiment, a partial oxidation process (i.e, gasification) may occur in gasifier 34. To facilitate the gasification process, an oxygen stream 38 is supplied to gasifier 34 from an air separation unit (ASU) 40. ASU 40 separates air 42 into component gases via, for example, cryogenic distillation techniques. ASU 40 separates oxygen 33 and nitrogen 44 from air 42 and transfers the separated oxygen 38 to gasifier 34. ASU 40 may also transfer the separated nitrogen 44 to another portion of system 10 or to storage and/or another facility.

In the exemplary embodiment, a resultant syngas stream 46 and slag 36 are produced by gasifier 34. Slag 36 is conveyed to a coarse slag handling system 48 that produces coarse slag 50 to be sold as product, and syngas stream 46 is conveyed to a cooler 52 for cooling and heat transfer. In the exemplary embodiment, cooler 52 may be a standalone unit or cooler 52 may be formed integral with gasifier 34. A first portion 54 of syngas stream 46 is conveyed to a scrubber 56 for removing certain particulate matter and other pollutants. In the exemplary embodiment, any suitable scrubbing technique may be used. Subsequently, a clean syngas 58 is routed from scrubber 56 to an expander 60 to facilitate energy recovery through the expansion of syngas stream 54. Syngas stream 54 may be further cooled, purified, and/or cleaned (not shown) and directed into a power system or power island 62 for use in the generation of power, and/or for the production of chemicals. For example, a portion of power island 62 may include, but is not limited to, a gas turbine 64 suitable for using syngas stream 54 as fuel and converting the fuel to rotational energy, which can be converted by a generator 65 into electrical power.

In the exemplary embodiment, power generation system 10 includes a steam turbine engine 66 and a heat recovery steam generation (HRSG) system 68. Steam turbine engine 66 may drive a load 70, which maybe an electrical generator for generating electrical power. Heated exhaust gas 72 from gas turbine engine 64 is transported into HRSG 68 and used to heat water and produce steam used to power steam turbine engine 66 for power generation. In addition, high-pressure, high-temperature steam produced by HRSG 68 may also be supplied to other processes where steam may be used, such as via line 74 to gasifier 34, drying unit 18 and/or pyrolysis unit 22, as described in more detail herein. Alternatively or in addition, a heat transfer line 76 may be coupled to gasifier 34 and/or to cooler 52 to supply a heat transfer fluid (e.g., water or steam) to drying unit 18 and/or pyrolysis unit 22 to provide at least a portion of the heating requirements thereof.

Figure 2:
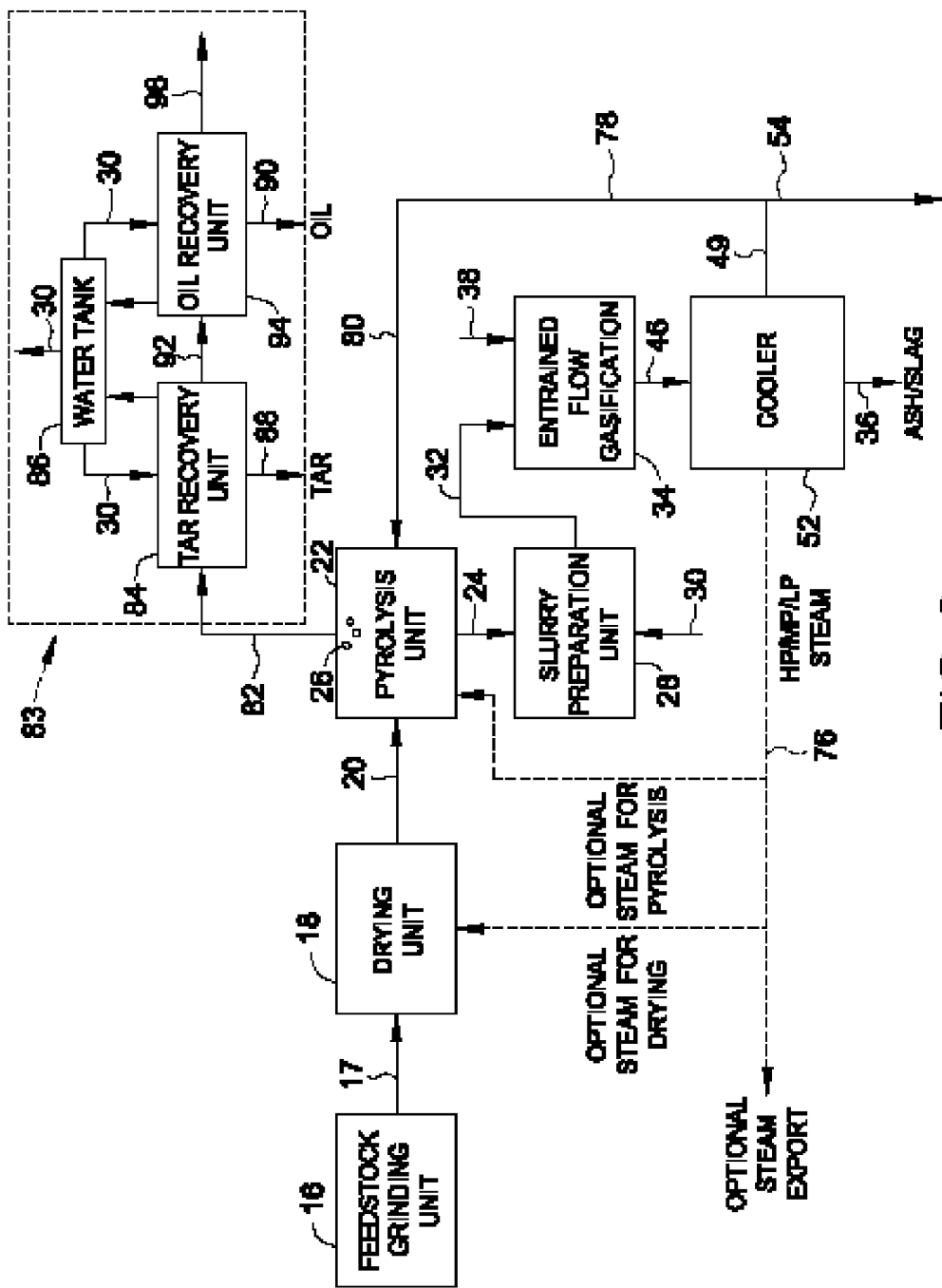
FIG. 2 is a detailed schematic view of the system shown in FIG. 1.

FIG. 2 illustrates a detailed schematic illustration of a portion of system 10 that is used to produce synthetic natural gas (SNG). As described herein, system 10 includes drying unit 18, pyrolysis unit 22, slurry preparation unit 28, entrained flow gasifier 34, and cooler 52. In the exemplary embodiment, cooler 52 is a combination quench and radiant synthesis gas cooler (RSC). However, cooler 52 may be any type of cooler that enables system 10 to function as described herein. Entrained flow gasifier 34 produces syngas a stream 46 containing primarily CO and H2 that is cooled in cooler 52 to produce cooled syngas stream 49, which is split into first portion of syngas 54 and a second portion of syngas 78. A portion of hot syngas stream 78 is recycled to steam pyrolysis unit 22 as a recycled syngas stream 80 to provide at least a portion of the heating requirements for the pyrolysis process that takes place in pyrolysis unit 22. In one embodiment, pyrolysis unit 22 acts as a heat exchanger such that recycled syngas stream 80 flows around or through unit 22 in separate channels without mixing with pyrolysis gas 26 or char 24. In the exemplary embodiment, such as when low rank coal is being used as the fuel, recycled syngas 80 mixes with pyrolysis gas 26 produced by the pyrolysis process and is then conveyed from pyrolysis unit 22.

In the exemplary embodiment, hydrocarbon-rich syngas stream 82 is conveyed to a by-product removal system 83 that includes a tar recovery unit 84, an oil recovery unit 94, and a water tank 86 in fluid communication with both tar recovery unit 84 and oil recovery unit 94. By-product removal system 83 is positioned between pyrolysis unit 22 and compression system 27. The pyrolysis gas portion of stream 82 contains hydrocarbons that cause the formation of liquid by-products such as tar 88 and light oil 90 when combined with syngas stream 80. Removal of such by-products is required because they may be harmful to downstream components of system 10 and also because such by-products have considerable value in other commercial applications.

In the exemplary embodiment, tar recovery unit 84 is configured to use water 30 from tank 86 to separate tar 88 from hydrocarbon-rich syngas stream 82. Tar 88 is removed from unit 84 as a by-product of syngas stream 82 and tar recovery unit 84 channels water 30 back to tank 86. In the exemplary embodiment, a partially treated tar-free syngas stream 92 is channeled downstream to an oil recovery unit 94 configured to remove light oil 90 from syngas stream 92. Oil recovery unit 94 receives water 30 from tank 86 and separates oil 90 from syngas stream 92 to form a fully-treated, clean synthetic natural gas stream 96. Oil recovery unit 94 channels water 30 back into tank 86 and removes oil 90 from unit 94 as a by-product of stream. 92. Tar 88 and oil 90 maybe channeled into gasifier 34 for use as a secondary fuel, or channeled out of system 83 for use in other applications. Water 30 will have a high chemical oxygen demand from removal of tar 88 and oil 90 that is conventionally difficult to treat for further use of water. However, water 30 from tar recovery unit 84 and oil recovery unit 94 maybe recycled and channeled to slurry preparation unit 28 for use in forming slurry feedstock 32 without requiring further treatment. In the exemplary embodiment, synthetic natural gas stream 96 is channeled to entrained flow gasifier 34 for use as a secondary gasifier feed. In an alternative embodiment, synthetic natural gas stream 96 is channeled downstream to join first potion 54 of syngas stream 49 before being channeled downstream for further processing. Alternatively, synthetic natural gas stream 96 may be fed into the combustor of a gas turbine of a natural gas combined cycle (NGCC) power plant and ignited to power the gas turbine for use in the generation of electricity or for general sale as SNG product.

In operation, grinding unit 16 receives a low-rank feedstock 14 (e.g, low rank coal or bagasse biomass) from fuel source 12 to supply drying unit 18. Feedstock 14 is heated and dried in drying unit 18 to produce dried feedstock 20 that is supplied to pyrolysis unit 22. Dried feedstock 20 undergoes a pyrolysis process in pyrolysis unit 22, which is heated by heat energy sources. In the exemplary embodiment, hot syngas recycle stream 80 provides the primary heat energy source for the pyrolysis process, and steam line 74, heat transfer line 76, and/or any other suitable heat source provides a supplemental heat energy source to pyrolysis unit 22 for the pyrolysis process.

During pyrolysis, moisture, volatiles, and hydrocarbons are substantially removed from feedstock 20 to produce char 24. The pyrolysis process essentially upgrades feedstock 20 from a low rank fuel to a fixed carbon 24 by reducing the oxygen and moisture contents of feedstock 20. The pyrolysis process described herein expands the choice of fuel to be used in gasification to include low cost and low rank fuels such as low rank coal and biomass fuel such as bagasse, that have not traditionally been used in gasification systems. Fixed carbon 24 is then supplied to slurry preparation unit 28 wherein it is mixed with water 30 or any other suitable liquid to form a suitable slurry feedstock 32. As described above, when bagasse is used as the feedstock, pyrolysis gas 26 maybe condensed and the recovered water maybe introduced as water 30 into slurry preparation unit 28. Moreover, water 30 maybe provided by introducing ground, but otherwise untreated, bagasse feedstock into slurry preparation unit 28. The grinding operation breaks down the cellular structure of the bagasse such that the moisture naturally found in untreated bagasse provides external water 30 used to create slurry 32. Slurry feedstock 32 is conveyed to entrained flow gasifier 34 where feedstock 32 is mixed with oxygen 33 discharged from ASU 40 and undergoes a high temperature, high pressure gasification process to produce syngas 46 and slag 36.

In the exemplary embodiment, slag 36 is channeled to coarse slag handling emit 48 to produce coarse slag 50, and syngas stream 46 is routed to cooler 52 wherein heat is transferred using a heat transfer fluid (e.g., water). Heat energy removed from syngas stream 45 may then be transferred via line 74 and/or line 76 to another portion of system 10. In the exemplary embodiment, at least a portion of the heating requirement of drying unit 18 and pyrolysis unit 22 is supplied by HRSG line 74 and/or heat transfer line 76.

In the exemplary embodiment, cooled syngas stream 49 is removed from cooler 52 and split into first syngas stream 54 and second syngas stream 78. Syngas steam 54 is conveyed to scrubber 56 wherein stream 54 is scrubbed, and the resulting clean syngas 58 is sent to expander 60 and/or to further cleaning/cooling. Syngas 58 is directed to power island 62 to produce electrical power via gas turbine 64. A resulting turbine exhaust 72 may be directed toward HRSG 68 to facilitate the generation of steam that is then directed to steam turbine 66 to produce additional electrical power via load 70 (e.g., a generator). System 10 includes a controller (not shown) that facilitates control of the relative proportion of syngas flow through first stream 54 and second stream 78 depending on desired system ore rations and demands. Alternatively, syngas 49 may be exclusively channeled to first stream 54 or second stream 78.

In the exemplary embodiment, second syngas stream 78 is conveyed to pyrolysis unit 22 as recycled syngas stream 80 to facilitate heating pyrolysis unit 22. In one embodiment, pyrolysis unit acts as a heat exchanger such that stream 80 does not mix with feedstock 20 during heating. Alternatively, recycle stream 80 heats dried feedstock 20 and mixes with pyrolysis gas 26 separated from feedstock 20 to form a hydrocarbon-rich syngas as stream 82, which is channeled from pyrolysis unit 22. The pyrolysis gas portion of stream 82 contains hydrocarbons that form liquid by-products such as tar 88 and light oil 90 when combined with syngas stream 80. A tar recovery unit 84 downstream of pyrolysis unit 22 is configured to use water 30 from a water tank 86 to separate tar 88 from hydrocarbon-rich syngas stream 82. Tar recovery unit 84 removes tar 88 from stream 82 and channels water 30 back to tank 86.

In the exemplary embodiment, a tar-free syngas stream 92 is channeled downstream to an oil recovery unit 94 configured to remove light oil 90 from syngas stream 92 using water 30 from tank 86 to forma clean synthetic natural gas stream 96. Tar 88 and oil 90 are valuable by-products of the pyrolysis process and may be used in a number of commercial applications. In the exemplary embodiment, synthetic natural gas stream 96 is channeled downstream to join first portion 54 of syngas stream 49 before being channeled downstream for further processing. Alternatively, synthetic natural gas stream 96 may be fed into the combustor of a gas turbine of a natural gas combined cycle (NGCC) power plant and ignited to power the gas turbine for use in the generation of electricity or for general sale as SNG product.

As described herein, systems and methods are provided for producing SNG and syngas from low rank feedstock such as low rank coal or a biomass fuel such as bagasse. A low rank feedstock is dried, fouled into a slurry, and subjected to a pyrolysis process in a low pressure, pyrolysis unit to form a pyrolysis gas and yield fixed carbon suitable for use in an entrained flow gasifier. The pyrolysis gas maybe condensed and the liquid ration mixed with the fixed carbon to form the slurry. At least a portion of the hot syngas produced from the entrained flow gasifier is used as a heat source for the pyrolysis unit and reacts with the pyrolysis gas to form a hydrocarbon-rich syngas stream that may then be channeled to tar and oil recovery units that use water to remove tar and oil byproduct from the hydrocarbon-rich syngas stream. Additional heating may be provided to a drying unit and to the gasifier by a heat transfer fluid from a cooler that cools the syngas product of the entrained flow gasifier. As such, the systems and methods described herein enable integration of pyrolysis and gasification systems to utilize lower cost, low rank fuels to produce chemicals and/or electrical power.

This written description uses examples to disclose the invention, including the best mode, and also to enable any person skilled in the art to practice the invention, including making and using any devices or systems and performing any incorporated methods. The patentable score of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Parts List gasification system 10
fuel source 12
low-rank feedstock 14
grinding unit 16
fuel 17
drying unit 18
dried feedstock 20
pyrolysis unit 22
fixed carbon 24
pyrolysis gas 26
compressor 27
slurry preparation unit 28
water 30
bagasse feedstock 31
slurry feedstock 32
gasifier 34
slag 36
oxygen 38
ASU 40
air 42
nitrogen 44
syngas stream 46
coarse slag handling system 48
coarse slag 50
cooler 52
first portion of syngas 54
scrubber 56
clean syngas 58
expander 60
power island 62
gas turbine engine 64
generator 65
steam turbine engine 66
HRSG 68
load 70
exhaust gas 72
steam line 74
heat transfer line 76
second syngas stream 78
syngas recycle stream 80
syngas stream 82
by-product removal system 83
tar recovery unit 84
water tank 86
tar 88
light oil 90
syngas stream 92
oil recovery unit 94
synthetic natural gas stream 96

What is claimed is:

1. A gasification system for use with low rank fuel, said system comprising:
a pyrolysis unit positioned to receive a feed of low rank fuel, said pyrolysis unit configured to pyrolyze said low rank fuel to produce pyrolysis gas and fixed carbon;
a gasifier configured to produce a syngas stream using a slurry feed;
a slurry preparation unit coupled in flow communication between said pyrolysis unit and said gasifier, said slurry preparation unit configured to receive said fixed carbon and produce said slurry feed that is conveyed to said gasifier;
a compression system coupled in flow communication between said pyrolysis unit and said slurry preparation unit, said compression system configured to condense at least a portion of said pyrolysis gas into a liquid that is channeled to said slurry preparation unit to facilitate producing said slurry feed;
a cooler configured to receive and cool said syngas stream;
a first conduit coupled between said cooler and said pyrolysis unit, said first conduit configured to recycle at least a portion of said syngas stream to said pyrolysis unit, wherein said recycled syngas stream is mixed with at least a portion of said pyrolysis gas to produce a hydrocarbon-rich syngas stream containing gasification by-products; and
a by-product recovery system coupled to said pyrolysis unit for removing gasification by-products from said hydrocarbon-rich syngas stream.

2. The system of claim 1, wherein said by-product recovery system comprises a tar recovery unit configured to remove tar from said hydrocarbon-rich syngas stream to form a partially treated syngas stream.

3. The system of claim 2, wherein said by-product recovery system further comprises an oil recovery unit configured to remove oil from said partially treated syngas stream to form a fully treated syngas stream.

4. The system of claim 3, further comprising a fluid tank in flow communication with said oil recovery unit and said tar recovery unit, said fluid tank is configured to receive a recycled fluid from said oil recovery unit and said tar recovery unit, and to provide recycled fluid to said slurry preparation unit.

5. The system of claim 1, wherein said first conduit is configured to recycle at least a portion of said syngas stream to said pyrolysis unit to facilitate heating said low rank fuel within said pyrolysis unit.

6. The system of claim 1, wherein at least a portion of said pyrolysis gas is channeled to said gasifier to form said syngas stream.

7. An integrated gasification combined-cycle power generation plant comprising:
at least one gasification system comprising:
a pyrolysis unit configured to receive low rank fuel, said pyrolysis unit further configured to pyrolyze said low rank fuel to produce pyrolysis gas and fixed carbon;
a gasifier configured to produce a syngas stream using a slurry feed;
a slurry preparation unit coupled in flow communication between said pyrolysis unit and said gasifier, said slurry preparation unit configured to receive said fixed carbon and to produce said slurry feed that is conveyed to said gasifier;
a compression system coupled in flow communication between said pyrolysis unit and said slurry preparation unit, said compression system configured to condense at least a portion of said pyrolysis gas into a liquid that is channeled to said slurry preparation unit to facilitate producing said slurry feed;
a cooler configured to cool said syngas stream;
a first conduit coupled between said cooler and said pyrolysis unit, said first conduit configured to recycle at least a portion of said syngas stream to said pyrolysis unit, wherein said recycled syngas stream is mixed with said pyrolysis gas to produce a hydrocarbon-rich syngas stream containing gasification by-products; and
a by-product recovery system coupled to said pyrolysis unit for removing said gasification by-products from said hydrocarbon-rich syngas stream; and
at least one gas turbine engine coupled in flow communication with said cooler to receive at least a portion of said syngas stream.

8. The plant of claim 7, wherein said by-product recovery system comprises a tar recovery unit configured to remove tar from said hydrocarbon-rich syngas stream to form a partially treated syngas stream.

9. The plant of claim 8, wherein said by-product recovery system further comprises an oil recovery unit configured to remove oil from said partially treated syngas stream to form a fully treated syngas stream.

10. The plant of claim 9, further comprising a fluid tank coupled in flow communication with said oil recovery unit and said tar recovery unit, wherein said fluid tank receives a recycled fluid from said oil recovery unit and said tar recovery unit, and provides said recycled fluid to said slurry preparation unit.

11. A said method of gasifying a low rank fuel, said method comprising:
providing a feed of low rank fuel to a pyrolysis unit;
pyrolyzing, by said pyrolysis unit, said feed of said low rank fuel to produce pyrolysis gas and fixed carbon;
condensing, by a compression system, at least a portion of said pyrolysis gas into a liquid;
producing, by a slurry preparation unit, a slurry feed using said fixed carbon and said liquid;
gasifying, by a gasifier, said slurry feed to produce a syngas stream;
mixing at least a portion of said syngas stream with said pyrolysis gas to produce a hydrocarbon-rich syngas stream containing gasification by-products; and
removing, using a by-product recovery system, said gasification by-products from said hydrocarbon-rich syngas stream.

12. The system of claim 11, wherein removing said gasification by-products from said hydrocarbon-rich syngas stream comprises removing tar from said hydrocarbon-rich syngas stream using a tar recovery unit and forming a partially treated syngas stream.

13. The system of claim 12, wherein removing said gasification by-products from said hydrocarbon-rich syngas stream comprises removing oil from said hydrocarbon-rich syngas stream using an oil recovery unit and forming a fully treated syngas stream.

14. The system of claim 13, further comprising channeling a recycled fluid between a fluid tank and said oil recovery unit and said tar recovery unit, wherein said fluid tank receives recycled water from said oil recovery unit and said tar recovery unit, and provides said recycled fluid to a slurry preparation unit.

* * * * *